United States Patent
Bognar et al.

(10) Patent No.: US 10,401,953 B2
(45) Date of Patent: Sep. 3, 2019

(54) SYSTEMS AND METHODS FOR EYE VERGENCE CONTROL IN REAL AND AUGMENTED REALITY ENVIRONMENTS

(71) Applicant: Pillantas Inc., Redwood City, CA (US)

(72) Inventors: Botond Bognar, Budapest (HU); Matthew D Moller, Petaluma, CA (US); Stephen R Ellis, Oakland, CA (US)

(73) Assignee: Pillantas Inc., Redwood City, CA (US)

( * ) Notice: Subject to any disclaimer, the term of this patent is extended or adjusted under 35 U.S.C. 154(b) by 0 days.

(21) Appl. No.: 15/335,262

(22) Filed: Oct. 26, 2016

(65) Prior Publication Data

US 2017/0131764 A1    May 11, 2017

Related U.S. Application Data

(60) Provisional application No. 62/246,200, filed on Oct. 26, 2015.

(51) Int. Cl.
*G06F 3/01* (2006.01)
*G06T 7/50* (2017.01)
*G06F 3/0484* (2013.01)
*G06F 3/0481* (2013.01)

(52) U.S. Cl.
CPC .............. *G06F 3/013* (2013.01); *G06F 3/012* (2013.01); *G06F 3/0481* (2013.01); *G06F 3/0484* (2013.01); *G06F 3/04845* (2013.01); *G06T 7/50* (2017.01); *G06T 2207/10028* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 5,583,795 | A * | 12/1996 | Smyth | A61B 3/0025 359/630 |
| 7,532,230 | B2 | 5/2009 | Culbertson et al. | |
| 8,235,529 | B1 * | 8/2012 | Raffle | A61B 3/113 351/209 |
| 8,885,882 | B1 * | 11/2014 | Yin | G06F 3/00 382/103 |
| 8,913,790 | B2 | 12/2014 | Hennessy | |
| 8,957,835 | B2 | 2/2015 | Hoellwarth | |
| 9,035,955 | B2 | 5/2015 | Keane et al. | |

(Continued)

OTHER PUBLICATIONS

Definition of Binocular Fixation, Mosby's Medical dictionary, https://medical-dictionary.thefreedictionary.com/binocular+fixation (Year: 2009).*

(Continued)

*Primary Examiner* — Kent W Chang
*Assistant Examiner* — Nathaniel P Brittingham
(74) *Attorney, Agent, or Firm* — Royse Law Firm, PC

(57) ABSTRACT

Systems and methods are provided that allow a person to exert control in real space as well as in virtual spaces. Eye tracking is employed to determine the direction of the viewer's gaze, and head tracking can be used as needed to track the viewer's head in order to provide a stable virtual environment. Eye vergence can then be used to as a triggering mechanism to initiate responses stored in association with objects in the field of view. Additionally, eye vergence can be used to provide a continuous control.

12 Claims, 15 Drawing Sheets

(56) References Cited

U.S. PATENT DOCUMENTS

| | | | |
|---|---|---|---|
| 9,170,645 B2 * | 10/2015 | Park | G06F 1/1626 |
| 9,442,567 B2 | 9/2016 | Scott et al. | |
| 9,454,225 B2 | 9/2016 | Bychkov et al. | |
| 2004/0240709 A1 | 12/2004 | Shoemaker | |
| 2005/0073136 A1 * | 4/2005 | Larsson | A61B 3/113 |
| | | | 280/735 |
| 2009/0153796 A1 * | 6/2009 | Rabner | A61B 3/0091 |
| | | | 351/201 |
| 2010/0033333 A1 * | 2/2010 | Victor | A61B 3/113 |
| | | | 340/576 |
| 2010/0118141 A1 * | 5/2010 | Bouchon-Meunier | |
| | | | H04N 5/232 |
| | | | 348/135 |
| 2010/0201621 A1 * | 8/2010 | Niikawa | G06F 3/013 |
| | | | 345/158 |
| 2011/0019874 A1 * | 1/2011 | Jarvenpaa | A61B 3/113 |
| | | | 382/103 |
| 2011/0109880 A1 * | 5/2011 | Nummela | A61B 3/113 |
| | | | 351/210 |
| 2012/0194550 A1 * | 8/2012 | Osterhout | G02B 27/0093 |
| | | | 345/633 |
| 2012/0212484 A1 * | 8/2012 | Haddick | G02B 27/0093 |
| | | | 345/419 |
| 2012/0300061 A1 * | 11/2012 | Osman | G06F 1/3231 |
| | | | 348/135 |
| 2013/0050432 A1 * | 2/2013 | Perez | H04N 13/0278 |
| | | | 348/47 |
| 2013/0147686 A1 * | 6/2013 | Clavin | G06F 3/013 |
| | | | 345/8 |
| 2013/0156265 A1 * | 6/2013 | Hennessy | A61B 3/113 |
| | | | 382/103 |
| 2013/0169532 A1 * | 7/2013 | Jahnke | G06F 3/013 |
| | | | 345/158 |
| 2013/0176533 A1 * | 7/2013 | Raffle | A61B 3/113 |
| | | | 351/209 |
| 2013/0241805 A1 * | 9/2013 | Gomez | G09G 3/003 |
| | | | 345/8 |
| 2013/0293580 A1 * | 11/2013 | Spivack | G06Q 30/0643 |
| | | | 345/633 |
| 2013/0300635 A1 * | 11/2013 | White | H04N 13/044 |
| | | | 345/7 |
| 2014/0002442 A1 * | 1/2014 | Lamb | G06F 3/1431 |
| | | | 345/419 |
| 2014/0002444 A1 * | 1/2014 | Bennett | G06F 3/012 |
| | | | 345/419 |
| 2014/0361984 A1 * | 12/2014 | Kim | G06F 3/013 |
| | | | 345/156 |
| 2014/0380230 A1 * | 12/2014 | Venable | G06F 3/013 |
| | | | 715/781 |
| 2015/0049114 A1 * | 2/2015 | Geisner | A63F 13/02 |
| | | | 345/633 |
| 2015/0091780 A1 | 4/2015 | Lyren | |
| 2015/0091943 A1 * | 4/2015 | Lee | G02B 27/0172 |
| | | | 345/633 |
| 2015/0185475 A1 * | 7/2015 | Saarikko | G02B 6/02085 |
| | | | 382/117 |
| 2015/0192992 A1 * | 7/2015 | Di Censo | G02B 27/01 |
| | | | 345/156 |
| 2015/0248169 A1 | 9/2015 | Abovitz et al. | |
| 2015/0277123 A1 * | 10/2015 | Chaum | G02B 27/0093 |
| | | | 348/62 |
| 2015/0288944 A1 * | 10/2015 | Nistico | G02B 27/0172 |
| | | | 345/156 |
| 2015/0339468 A1 * | 11/2015 | Son | G06F 21/31 |
| | | | 726/19 |
| 2016/0026242 A1 * | 1/2016 | Burns | H04N 9/31 |
| | | | 345/633 |
| 2016/0093113 A1 * | 3/2016 | Liu | G06F 3/013 |
| | | | 345/156 |
| 2016/0179336 A1 | 6/2016 | Ambrus et al. | |
| 2016/0239081 A1 | 8/2016 | Imoto et al. | |
| 2016/0246384 A1 | 8/2016 | Mullins et al. | |
| 2016/0260258 A1 * | 9/2016 | Lo | G06T 7/00 |
| 2017/0131764 A1 * | 5/2017 | Bognar | G06T 7/50 |

OTHER PUBLICATIONS

Crossman, et al., "Feedback control of hand-movement and Fitts' Law", 1983, The Quarterly Journal of Experimental Psychology Section A: Human Experimental Psychology, 35:2, 251-278.

Hoffman, et al., "Vergence-accommodation conflicts hinder visual performance and cause visual fatigue", Journal of Vision, Mar. 2008, vol. 8, 33.

Ranney, "Mice get under foot", InfoWorld, Aug. 19, 1985.

Rolland, et al., "Head-mounted display systems", Encyclopedia of Optical Engineering DOI: 10.1081/E-EOE-120009801, Taylor & Francis, London, available as early as Jan. 1, 2005, 14 pages.

Zangemeisster et al., "Active head rotations and eye-head coordination", 1981, Annals New York Academy of Sciences, pp. 540-559.

Youcha et al., "Evidence-based practice in biofeedback and neurofeedback", 2008, Association for Applied Psychophysiology and Biofeedback.

PCT/US16/58944, International Search Report and Written Opinion, dated Jan. 13, 2017.

* cited by examiner

SYSTEMS AND METHODS FOR EYE VERGENCE CONTROL IN REAL AND AUGMENTED REALITY ENVIRONMENTS

CROSS-REFERENCE TO RELATED APPLICATIONS

This application claims priority to U.S. provisional patent application No. 62/246,200 filed on Oct. 26, 2015 and entitled "Eye Controlled Virtual User Interface and Associated Information Structure" which is incorporated herein by reference in its entirety.

BACKGROUND

Field of the Invention

The invention is in the field of human-machine interfaces and more particularly in the field of user control of real and virtual user interfaces based on eye tracking.

Related Art

Augmented Reality (AR) headsets include wearable eyeglasses that include an optical combiner that can act as transparent screens and are used to produce virtual images that are superimposed over a real-world background. U.S. Pat. No. 9,035,955, invented by Keane et al. and U.S. Patent Application Publication No. 2015/0248169, invented by Abovitz et al. disclose examples of AR glasses.

Virtual Reality (VR) headsets include wearable viewing screens that block out vision of the real world and are used to create a view of a completely synthetic environment. U.S. Pat. No. 8,957,835, invented by Hoellwarth discloses an example of a VR headset.

Mixed Reality (MR) can be thought of as a continuum of user interaction environments that range between a real environment and a totally virtual environment (Milgram & Colquhou, 1999). MR blends virtual worlds with the real world to produce new environments and visualizations where digital objects can appear to interact with the objects of the real world to various amounts, rather than just being passive within the real-world context.

SUMMARY

The present invention provides methods for a person to exert control through eye vergence, the simultaneous movement of the pupils toward or away from one another during binocular fixating. These methods can be used to exert control in real space as well as in virtual spaces. These methods require the presence of at least some hardware, including hardware capable of tracking both eyes, and hardware for analyzing the eye tracking output. Hardware is also necessary for implementing the intended control, whether by rendering a virtual reality differently in response to the eye vergence, or by similarly triggering actions in the real world such as dimming the room lights, changing a TV channel, or causing a robotic camera to take a picture. Hardware is described herein primarily in terms of head-mounted devices that incorporate all of the components necessary to track eye movement, head movement, to render virtual or digital images, and to implement other methods of the invention that detect eye vergence and act accordingly. It will be understood, however, that any, some, or all of these functions can be performed by hardware located off of the person's body.

An exemplary method comprises, or simply consists of or consists essentially of, the steps of fixating on an object and causing a response by eye vergence. In various embodiments the object is a real object or a virtual object, and in the latter embodiments the virtual object can exist in a virtual reality, augmented reality, or mixed reality. In various embodiments the response is a virtual response, that is, a response affecting the presentation of a virtual reality to the person, or a real response, that is, affecting the person's real world environment. Examples of virtual responses include translations and rotations of the virtual object, where the translations can be either towards or away from the person in addition to laterally. Another exemplary virtual response is to trigger new displays, such as new levels of a menu structure. Virtual responses include launching applications that manifest in the virtual reality, selecting virtual objects, tagging objects, playing sounds, acquiring a "screen shot," adjusting parametric data associated with the object, and so forth.

DETAILED DESCRIPTION OF THE INVENTION

Figure 1A:
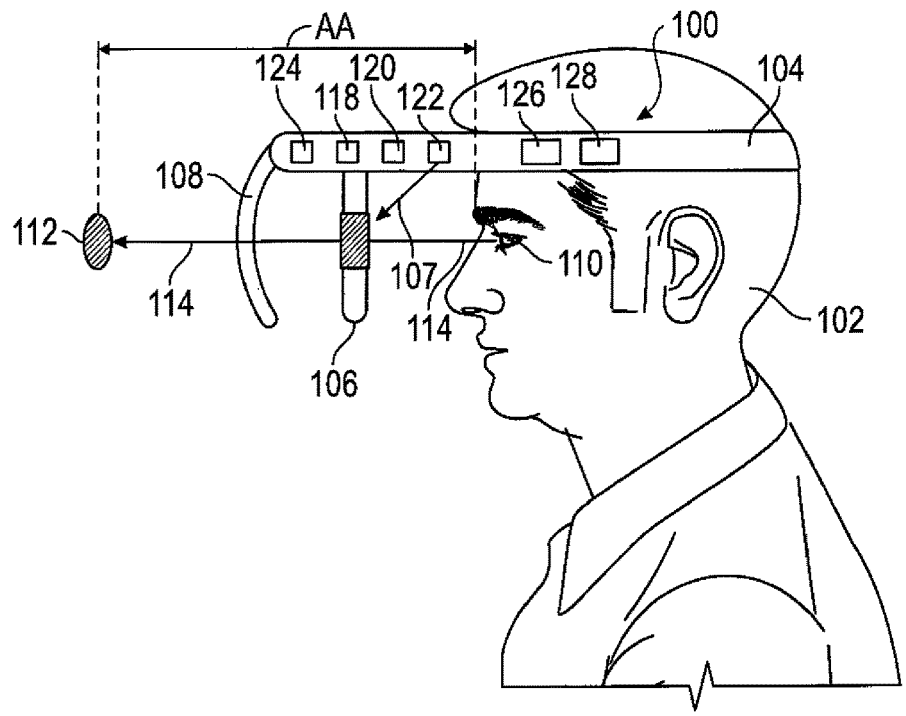
FIGS. 1A and 1B are side and top views, respectively, of an augmented reality headset, according to various embodiments of the invention, worn on the head produce virtual images that augment the viewer's real world view.

The following description is presented to enable persons skilled in the art to create and use the eye vergence controlled systems and methods described herein. Various modifications to the embodiments will be readily apparent to those skilled in the art, and the generic principles defined herein may be applied to other embodiments and applications without departing from the spirit and scope of the inventive subject matter. Moreover, in the following description, numerous details are set forth for the purpose of explanation. However, one of ordinary skill in the art will realize that the inventive subject matter might be practiced without the use of these specific details. In other instances, well known machine components, processes and data structures are shown in block diagram form in order not to obscure the disclosure with unnecessary detail. Identical reference numerals may be used to represent different views of the same item in different drawings. Flowcharts in drawings referenced below are used to represent processes. A hardware processor system may be configured to perform some of these processes. Modules within flow diagrams representing computer implemented processes represent the configuration of a processor system according to computer program code to perform the acts described with reference to these modules. Thus, the inventive subject matter is not intended to be limited to the embodiments shown, but is to be accorded the widest scope consistent with the principles and features disclosed herein.

While methods of the present invention can be implemented in any of AR, MR, or VR, and will be described with reference to the AR and VR headsets discussed with reference to the following drawings that can be used to implement these methods. It will be understood that other systems or devices that are not worn on the user's head at all, or that locate some but not all components on the head, can also be used to generate virtual environments for the user. Thus, methods of the invention described herein are not limited to implementation by head-mounted devices and can also employ back-projected screens for stereoscopic presentations, for example. Finally, methods of the invention can be implemented in real-world contexts without implementing any of AR, MR, or VR.

FIG. 1A illustrates an exemplary AR headset embodiment 100 mounted on a head 102 of a user, also referred to herein as the person or viewer, to produce virtual or digital images that augment the user's view of the real world. The headset 100 includes means for securing the headset 100 to the user's head 102, such as the arms of a pair of glasses, an adjustable headband, or a partial or full helmet, where such means are represented herein generally by mount 104. The headset 100 also includes a transparent display screen 106 and a transparent protective visor 108. In various embodiments the display screen 106 only appears transparent but is actually opaque and made to appear transparent by optical means. The display screen 106 and the protective visor 108 are both suspended from the mount 104 so as to be disposed in front of the viewer's eyes 110 with the display screen 106 positioned between the eyes 110 and the protective visor 108. The protective visor 108 also may be disposed to provide optical power, such as in ordinary reading glasses, to produce the virtual images that the user views. The optical system itself may be customized to provide personalized optical corrections for user who normally need to use spectacles. The headset 100 further includes an eye tracking module 118 to monitor movements of both eyes 110 and a head tracking module 120 to monitor movement of the viewer's head 102. Exemplary eye tracking modules 118 suitable for headset 100, as well as eye tracking eyeglasses, are available from both SensoMotoric Instruments, Inc. of Boston, Mass. and Pupil Labs UG, of Berlin, Germany. Head tracking typically employs coils that pick up induced currents from constant or pulsed magnetic fields, or by camera-based processing of fixed active or passive fiducial markers on rigid bodies attached to the head 102. A user's gaze direction in space is determined by first determining viewer's eye's gaze direction with respect to their head 102 and then adding it to their head's forward direction in space.

An image generation device 122, consisting of a computer graphics system to calculate a geometric projection of synthetic environment and a physical visual display to present particular views of this environment, is configured to produce images 116L and 116R (FIG. 1B; shown together as ray 107 in FIG. 1A) on the display screen 106 that is perceived by the viewer as augmenting their view of the real world as seen through the display screen 106 and visor 108. Image generation device 122 can include a processor to render the images 116L and 116R or the images 116L, 116R can be provided to the image generation device 122 from a processor 126 noted below.

A spatial sensor 124 detects physical objects and maps those objects so that, for example, virtual images can be correctly and accurately displayed in relation to the real-world objects. In some embodiments, the spatial sensor 124 includes an infrared (IR) detector, LIDAR, or a camera that detects markers on rigid bodies. In some embodiments, the spatial sensor 124 measures the distances from the headset 100 to the real-world objects, and as a user turns her head 102, a map can be produced from the distance data, where the map includes three-dimensional geometric representations of objects in the environment. A suitable example of such mapping is simultaneous localization and mapping (SLAM) and can be performed either by a processor within the spatial sensor 124 or by a processor 126, described below, in communication with the spatial sensor 124.

Processor 126 is configured with instructions stored within a non-transitory storage device 128. The processor 126 is in communication with other components such as eye tracking module 118, head tracking module 120, spatial sensor 124, and image generation device 122 to work in conjunction with processing within these components or to provide the computation power these components lack.

Figure 1B:
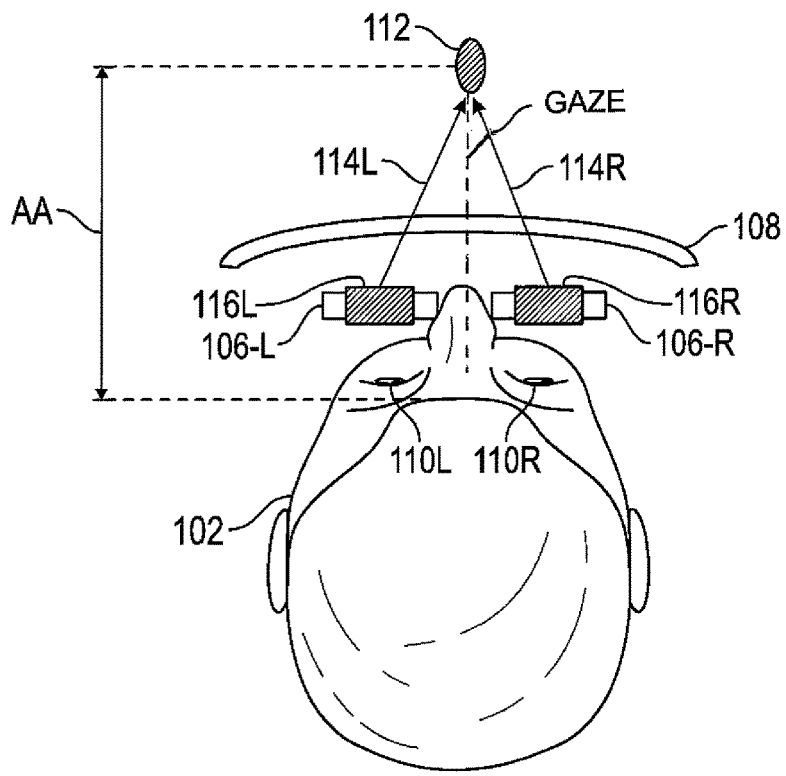

In FIGS. 1A and 1B, because of binocular presentation, the user perceives a virtual three-dimensional (3D) image 112, which corresponds to the projected image 116 at a spatial location at distance AA from the eyes 110. The virtual 3D image 112 is perceived as being disposed beyond the display screen 106, such that the display screen 106 is seen as being disposed between the eye 110 and the virtual 3D image 112. A virtual sight line 114 extends from each of the user's eyes 110, through the display screen 106 and through the protective visor 108, to the perceived location of the virtual 3D image 112, which is perceived by the viewer to be at a distance AA from the eyes 110.

The top view of FIG. 1B shows sight lines for the left and right eyes, 114L and 114R, that the user mentally combines to perceive the virtual 3D image 112 at the distance AA. The image generation device 122 produces a left real image 116L on a left portion 106L of the display screen 106 and a right real image 116R on a right portion 106R of the display screen 106. In some embodiments, the image generation device 122 is embedded within the display screen 106 and includes optics to provide sufficient eye relief to allow comfortable viewing. In the illustrated embodiment, the image generation device projects the left and right real images 116L, 116R onto the display screen 106. Thus, the user's left eye 110L receives a left eye view along the virtual left eye sight line 114L and the user's right eye 110R receives a right eye view along the right eye sight line 114R to perceive the virtual 3D image 112 at the distance AA.

Figure 2A:
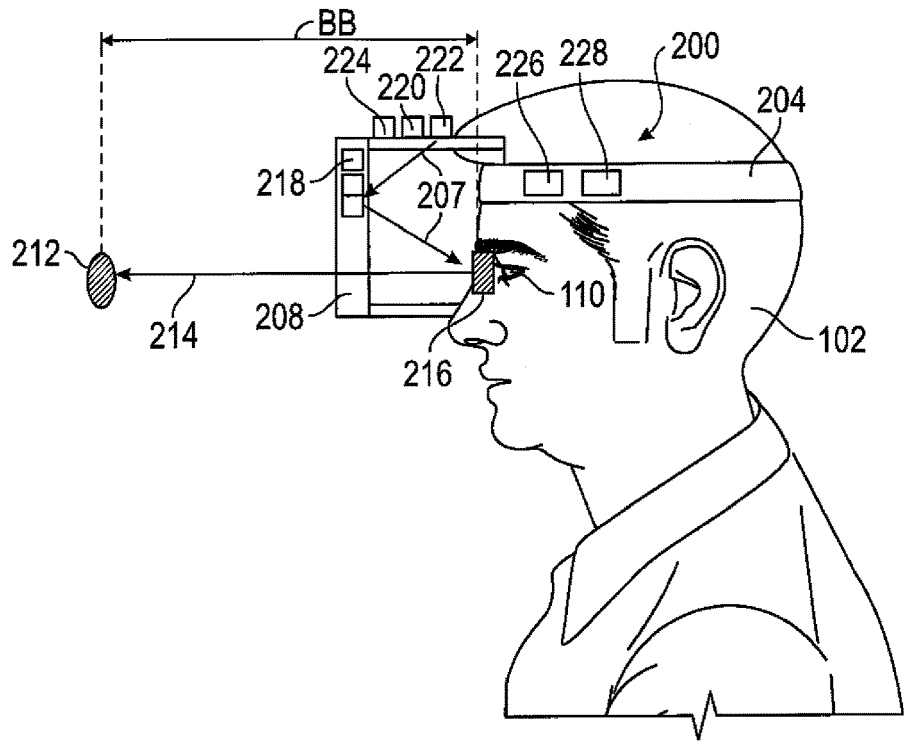
FIGS. 2A and 2B are side and top views, respectively, of an augmented reality headset, according to various embodiments of the invention, worn on the head produce virtual images that augment the viewer's real world view.

FIG. 2A shows a second exemplary AR headset embodiment 200 mounted worn on the head 102 of a user to produce virtual images that augments the user's view of the real world. The headset 200 similarly includes a mount 204, as described above, and a transparent protective visor 208. The protective visor 208 is suspended from the mount 204 so as to be disposed in front of a user's eyes 110 and may act as a semitransparent mirror with optical power, as discussed. The headset 200 further includes a head tracking module 220, an eye tracking module 218, and a spatial sensor 224, as generally described with respect to headset 100. The headset 200 further includes an image generation device 222 that in these embodiments projects an image 216 onto the retina of each of the user's eyes 110 as indicated by an image projection ray 207. More particularly, in some embodiments, the image generation device 222 projects the image onto an inside surface of the protective visor 208, which reflects the projected image back to the user's eyes 110. A processor 226 and non-transitory storage device 228 including instructions also comprise parts of the headset 200.

The user perceives a virtual 3D image 212, which corresponds to the projected image 216 at a spatial location and at a distance BB from the eyes 110. The virtual 3D image 212 is disposed in front of the user's eyes 110 with the protective visor 208 disposed between the second virtual 3D image 212 and the user's eye 110. A line of sight 214 extends from each of the user's eyes 110, through the protective visor 208, to the perceived virtual 3D image 212, which is perceived by the user to be at a distance BB from the eyes 110.

Figure 2B:
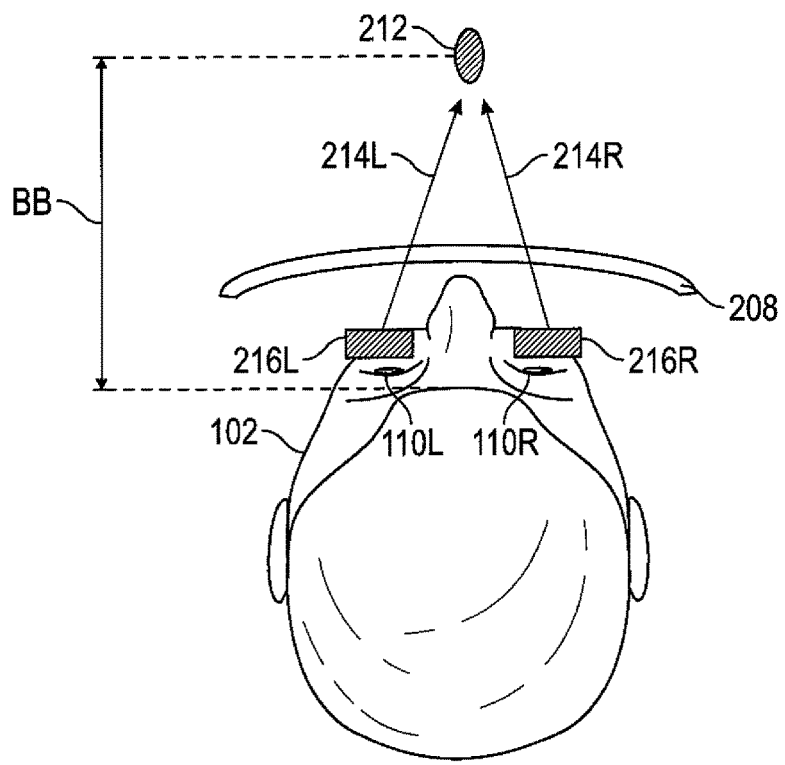

FIG. 2B is a top view of the headset 200 showing left and right sight lines 214L and 214R that the user mentally combines to perceive the virtual 3D image 212 as described with respect to the headset 100.

Figure 3A:
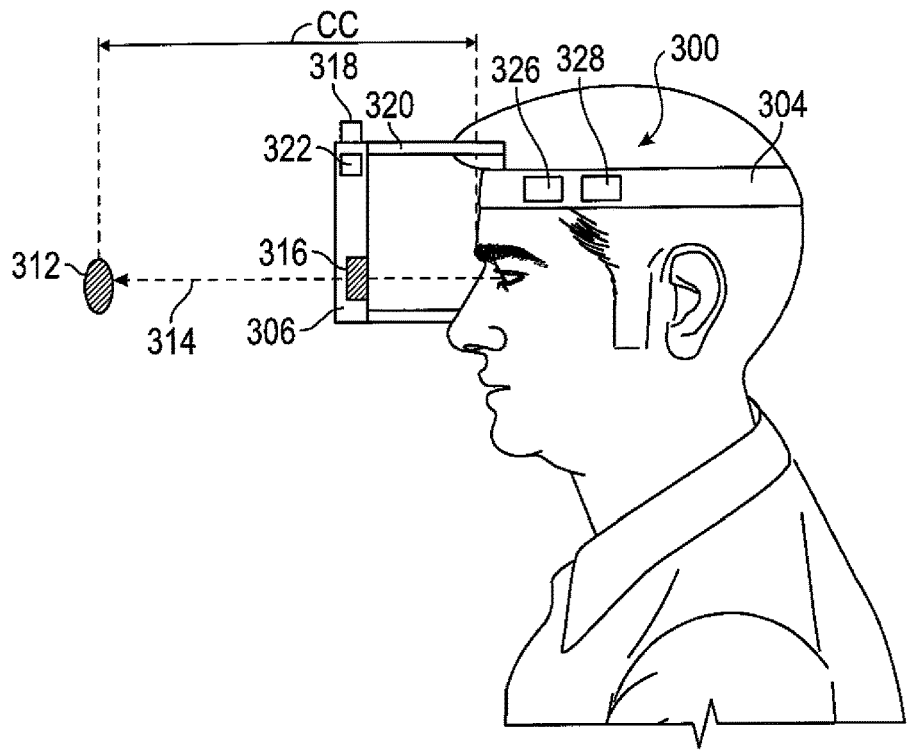
FIGS. 3A and 3B are side and top views, respectively, of a virtual reality headset, according to various embodiments of the invention, worn on the head produce a virtual reality.

FIG. 3A shows an exemplary embodiment of a VR headset 300 mounted on a head 102 of a user to produce interactive 3D virtual images. The third headset embodiment 300 includes a mount 304 and an opaque display screen 306. In these embodiments either the mount 304, or the mount 304 in combination with the display screen 306, blocks the user's view of the real world either completely or substantially. The display screen 306 is attached to the mount 304 so as to be disposed in front of a user's eyes 110.

The headset 300 further includes a head tracking module 320, an eye tracking module 318, and a spatial sensor 324, as generally described with respect to headset 100. The headset 300 further includes an image generation device 322 that produces an image 316 on the display screen 306, for example, by any of the methods of the prior embodiments. A processor 326 and non-transitory storage device 328 including instructions also comprise parts of the headset 300.

The user perceives a virtual 3D image 312, which corresponds to the image 316 at a spatial location at distance CC from the eyes 110. The virtual 3D image 312 is disposed in front of the user's eyes 110 with the display screen 306 disposed between the virtual 3D image 312 and the user's eyes 110. A sight line 314 extends from each of the user's eyes 110, through the display screen 306 to the perceived virtual 3D image 312, which is perceived by the user to be at a distance CC from the eyes 110.

Figure 3B:
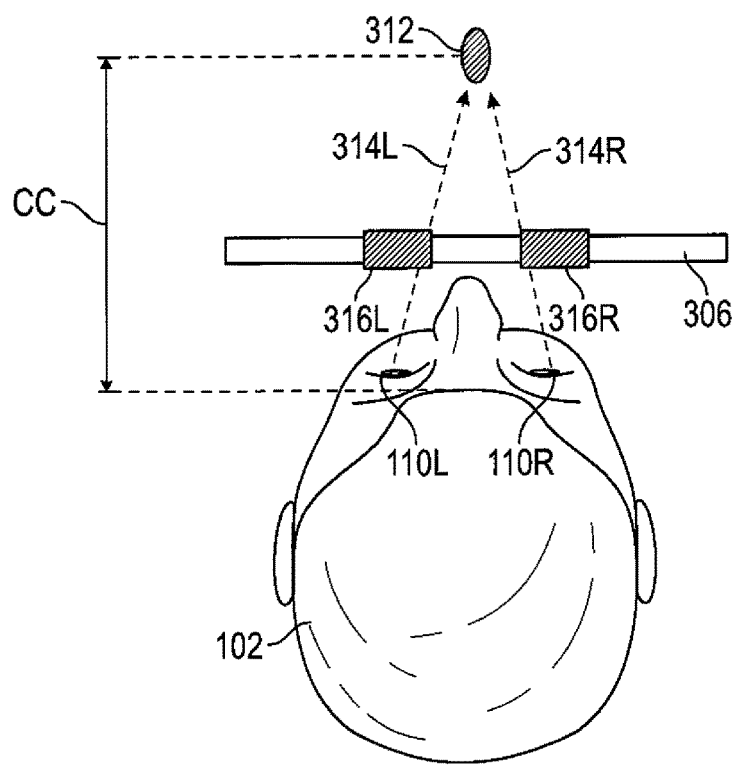

FIG. 3B is a top view of the headset 300 showing left and right sight lines 314L and 314R that the user mentally combines to perceive the virtual 3D image 312 as described with respect to the headset 100.

User control through tracking of eye vergence will now be described. The following embodiments describe methods that can be performed by a viewer to exert control through the use of eye movements, as well as methods of providing virtual realities, detecting eye movements, and varying the virtual reality in response to the eye movements. The methods of use do not necessarily require the viewer to wear a headset at all; in these embodiments eye tracking and head tracking, as well as image production, are all through external means. In some embodiments the viewer wears a headset with eye tracking and head tracking but the images are produced by means that are external to the headset. Various other combinations of headset-mounted and external components could also be employed so long as the user's eyes are tracked, and optionally the user's head is tracked and/or images are projected before the user's eyes. For instance, one camera on a cell phone can be configured to perform eye tracking, and the detection of eye vergence triggers the acquisition of a picture with the opposite-facing camera. Additionally, in addition to trigger responses, continuous and/or nondiscrete actions may be possible based on variable amounts of voluntary eye vergence.

Methods of the invention that provide virtual reality interfaces and track eye movement to allow a user to control the interface can be performed by headsets like headsets 100-300 as well as systems in which various or all components are external to the headset. For instance, the processor can be worn elsewhere on the body, or can be located off of the body but nearby, and either in Wi-Fi or wired communication with the headset. The computer instructions stored on the non-transitory memory device, whether as part of a headset or remote thereto, can include instructions necessary to direct the processor to perform the steps of these methods.

These methods, and the user methods, will first be illustrated with respect to a user controlling items like menu structures in a virtual environment. Generally, a system of the invention such as a headset produces a sense of virtual reality by reaction to a virtual environment which in one embodiment may be seen on a portion of a surface in front of the user where that virtual surface is at a distance from the user's eyes. The user accordingly perceives the virtual reality, separate from the real world, or integrated therewith with a gaze that fixates to the distance of the virtual surface. The user's head is tracked to maintain the virtual space, and the user's eyes are tracked to determine a change of fixation and to approximate the new fixation distance, sometimes denoted as z. The user can control menu structures, and achieve other controls, by aiming her head to direct her gaze in a particular orientation and by then refocusing her eyes appropriately such that her eye vergence serves to trigger a response. Eye vergence alone, or in combination with another signal such as a blink or a head nod, can trigger a response or control an object, virtual or real. These secondary signals can also be used to confirm a command made by eye vergence. While the first examples show menu structures, eye vergence can similarly be used to control virtual objects in the virtual reality to reposition, rotate, bring them forward, and push them away, or manipulate any other parameters such as color, associated data, etc.

It is further noted that the vergence detection can be "off-axis" such that the viewer's gaze line is not in line with her head's orientation, depending on the deflection of the eyes and/or depending on where the object is located within the field of view. Also, the eye gaze direction may be added to the head orientation on which the eyes rest, in some embodiments.

Figure 4:
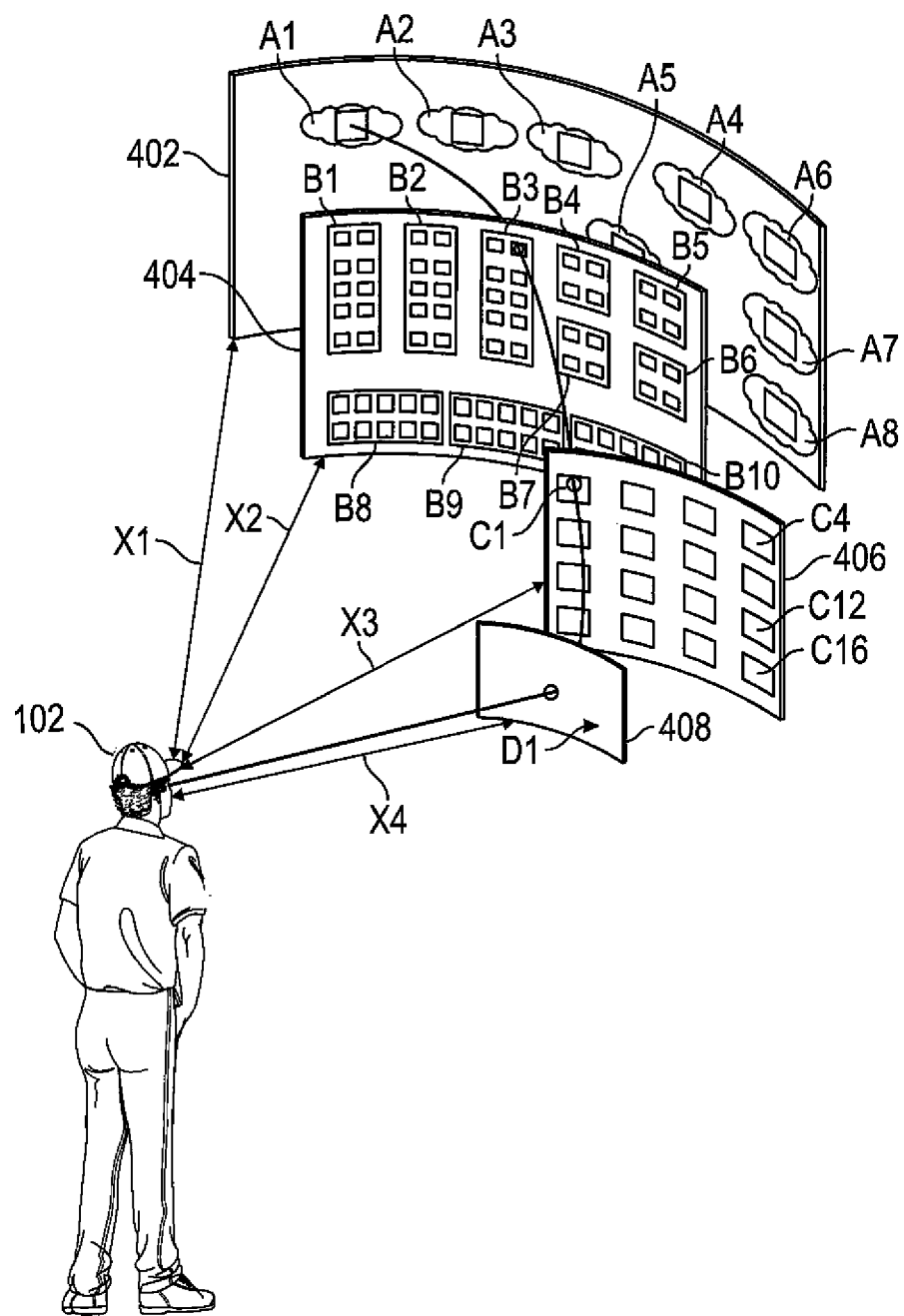
FIG. 4 shows a perspective view of a sequence of virtual three dimensional (3D) user interface display surfaces according to various embodiments of the invention.

FIG. 4 shows an exemplary composite view of a sequence of four virtual 3D user interface display surfaces produced in accordance with some embodiments. These successive surfaces can represent different levels of a menu structure, for example. A first virtual display surface 402 is shown disposed at a first distance $x_1$ from a user's head 102. A second virtual display surface 404 is shown disposed at a second distance $x_2$ from the user's head 102. A third virtual display surface 406 is shown disposed at a third distance $x_3$ from the user's head 102. A fourth virtual display surface 408 is shown disposed at a fourth distance $x_4$ from the user's head 102. In this example, each closer display surface represents a successively deeper level of the menu structure.

In some embodiments, the distances at which successive virtual display surfaces are displayed are selected to simulate physical distances a user may encounter in the real world. For example, the distances can be selected to simulate a user searching for a book in a library. As a further example, the first virtual display surface 402 can be displayed at a 'searching' $x_1$ distance that is approximately eight times normal 'reading distance,' i.e., a distance that a person typically holds a book from their eyes when reading. The second virtual display surface 404 can be displayed at an 'approach' distance $x_2$ of four times the normal reading distance, the third virtual display surface 406 can be displayed at a 'reach-out' distance $x_3$ of twice the normal reading distance, while the fourth virtual display surface 408 can be displayed at the 'reading' distance $x_4$, equal to the normal reading distance. Here, the virtual distances $x_1$ to $x_4$ are selected to simulate a user approaching a menu structure, where the objects in the closest display surface are perceived to be at a distance in the virtual environment where the user can grasp them. As described further below, the user moves through the several virtual display surfaces by adjusting eye fixation, and as one virtual display surface is selected and presented to the user, the prior one is removed or deemphasized, for instance, by being blurred, made increasingly transparent, or given reduced contrast.

The number of display surfaces, and the distances therebetween, are not limited by the preceding example. In various embodiments the distances can be varied dynamically. For example, these distances for a given menu structure can be varied in an AR or MR environment in response to the real-world component thereof. The same menu, when the user is in an open area can have wider spacings between virtual display surfaces then when the user is in a confined space, such as a bus seat. Mapping from a spatial sensor can be used to dynamically set such spacings.

In operation, the first virtual display surface 402 is initially displayed, being the highest level of the menu structure, and includes a plurality of selectable items A1-A8, each associated with an alternative next lower level of the menu structure. In some embodiments, associated with each item on the first virtual display surface 402 is a visual aid at a distance that is closer to the user than the item itself; the visual aid appears to the user to be in front of the associated item.

Visual aids provide virtual cues to the viewer to aid the process of eye vergence, but once a person acquires the skill, such cues typically become unnecessary. In various embodiments, the salience of the visual aid can be varied by making it blink or shimmer, larger or smaller, providing leading movement, or by varying its alpha, for example. Salience can be adjusted to make visual aids apparent without being distracting, and can become more or less salient as one's gaze approaches or moves away from the visual aids. In some instances, salience can be varied by the image generation device to lead the viewer to modify the dynamic properties of their eye vergence, such as to accelerate or decelerate eye vergence, creating a feedback that can be used, for example, to draw a virtual object closer or push it away. Here, rather than a trigger response, the system provides for continuous control. Visual aids can be represented as a visual ladder, in some instances, rather than a single spot, where the successive points of the ladder trigger differing actions and have different saliences.

In the example of FIG. 4, the second virtual display surface 404 is displayed in response to the user selecting item A1 by bringing her binocular fixation off of the first virtual display surface 402 and towards the visual aid associated with item A1, changing eye vergence. While eye vergence alone can be sufficient for some control actions, items can also be selected, or actions triggered or confirmed, by an additional blink, wink, nod, button press, spoken command, and so forth.

Figure 5A:
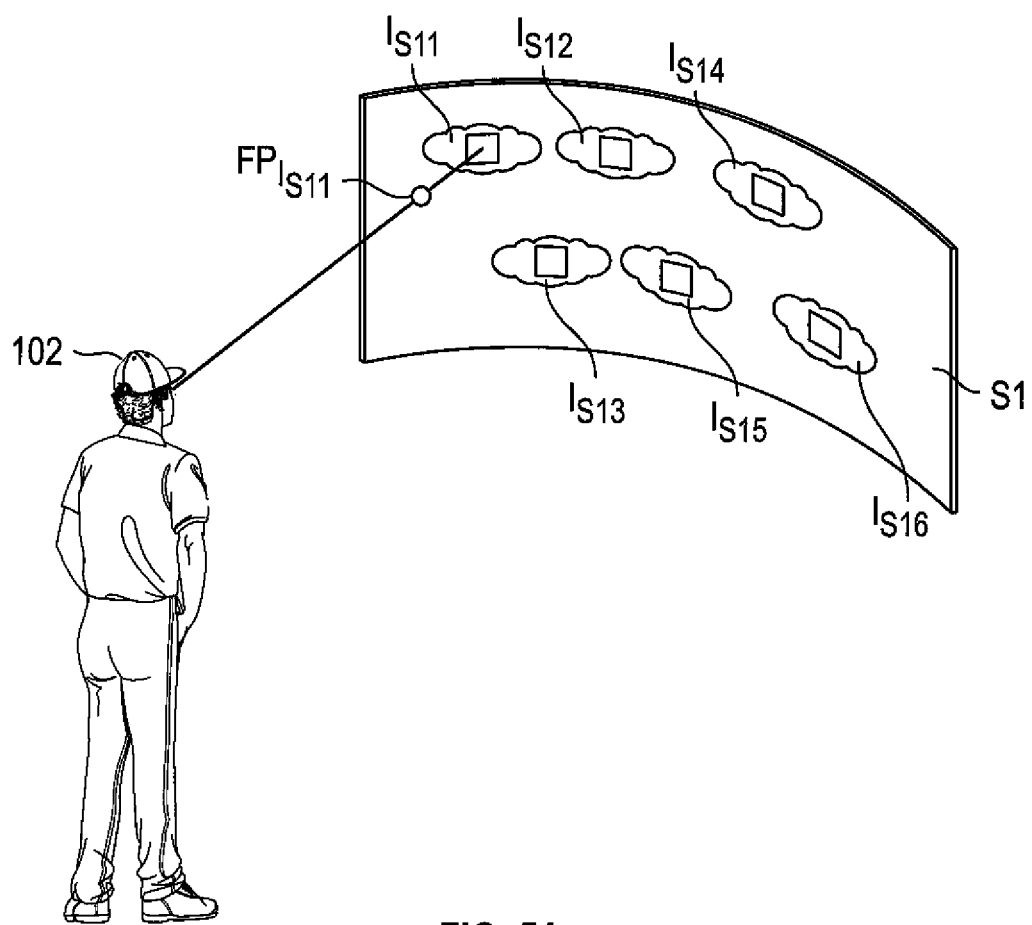
FIGS. 5A and 5B, 6A and 6B, 7A and 7B, and 8A and 8B are perspective and side views, respectively, of a user stepping through successive display surfaces, according to various embodiments of the invention.
Figure 5B:
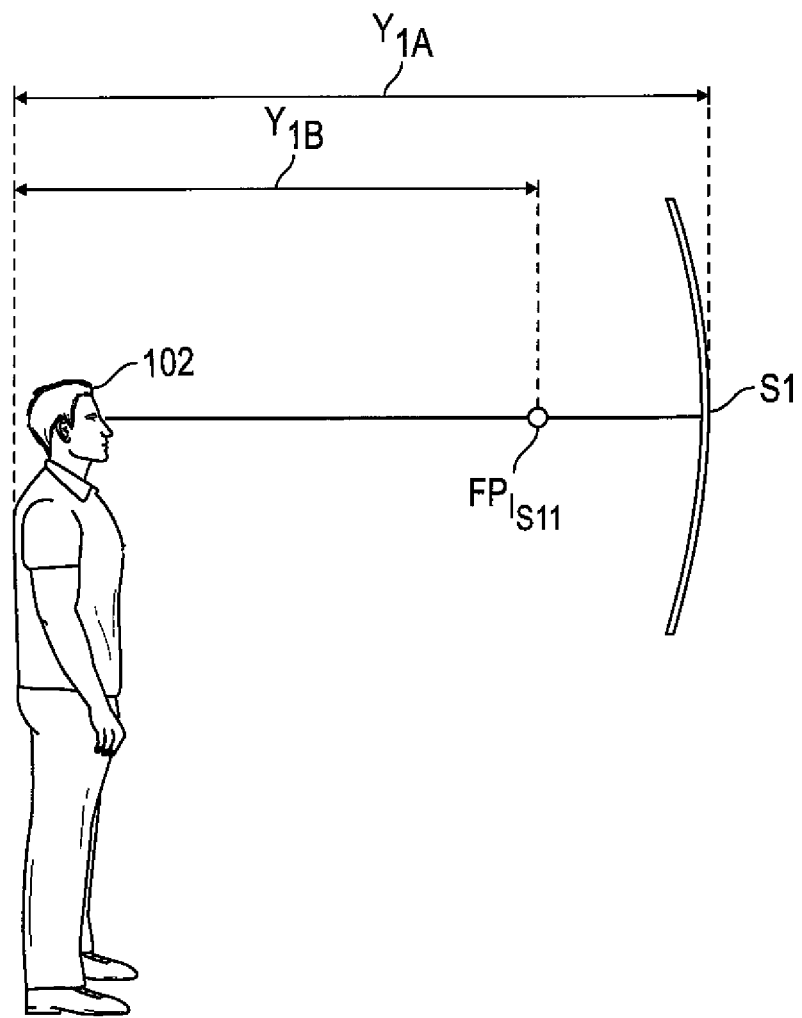

FIGS. 5A-8B shows a user navigating through an exemplary sequence of fixation points and a corresponding sequence of virtual display surfaces in accordance with some embodiments. FIGS. 5A-5B are perspective and side views, respectively, of a user whose head 102 is disposed at a first distance $Y_{1A}$ from a first virtual display surface S1 and a distance $Y_{1B}$ from a first fixation point $FP_{IS11}$ associated with a first item $IS_{11}$ displayed on the first virtual display surface S1. The distance $Y_{1A}$ is a greater distance than $Y_{1B}$, and therefore, the first fixation point $FP_{IS11}$ is disposed in front of the first virtual display surface S1, relative to the position of the user's head 102. In this embodiment the first virtual display surface S1, and the subsequent display surfaces, are spherically curved to indicate that from the perspective of the user, all points on the surface S1 are equidistant. It should be noted that projection onto a particularly spherical surface is not a requirement so long as an intercept between a gaze direction and the surface may be determined. It is also noted that the term "fixation point" is being used here in place of the terms "focal point" and "focus point" in the priority application.

An optional virtual visual aid B1 can be provided to the user in the form of a visual aid beam, or ray, or beam spot that shines on the surface S1 to indicate to the user where the user is looking, according to the head tracking module. The user can adjust her head position to direct the visual aid B1 to a selectable item on the surface S1. In the illustrative example in FIG. 5A, the visual aid B1 is directed at selectable item $I_{S11}$. In accordance with some embodiments, to select item $I_{S11}$, the user brings her fixation to the associated fixation point $FP_{IS11}$, and optionally signals with an eye blink. An eye tracking module detects the change in user fixation and any blinking. In response to the signal while fixating on the fixation point $FP_{IS11}$, a processor causes an image generation device to display a second virtual display surface S2A, as shown in FIGS. 6A-6B.

Figure 6A:
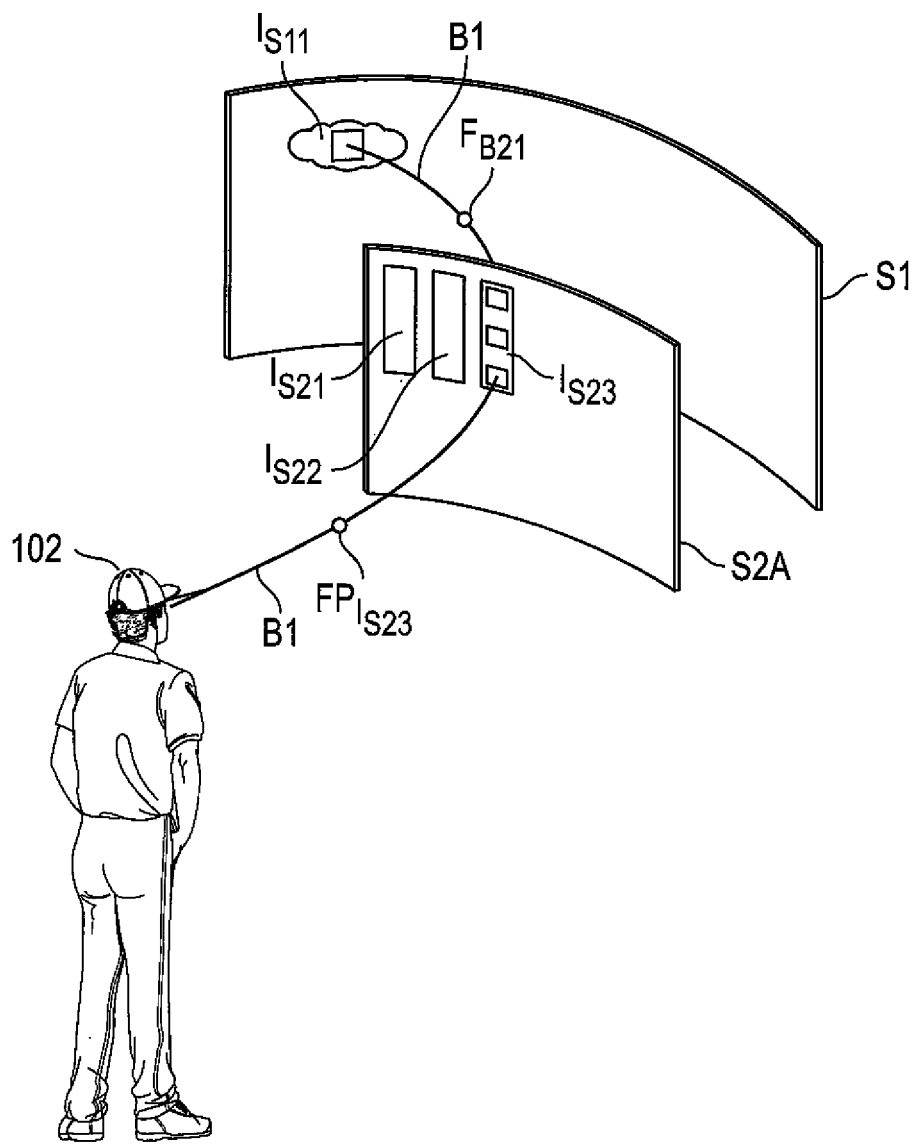
Figure 6B:
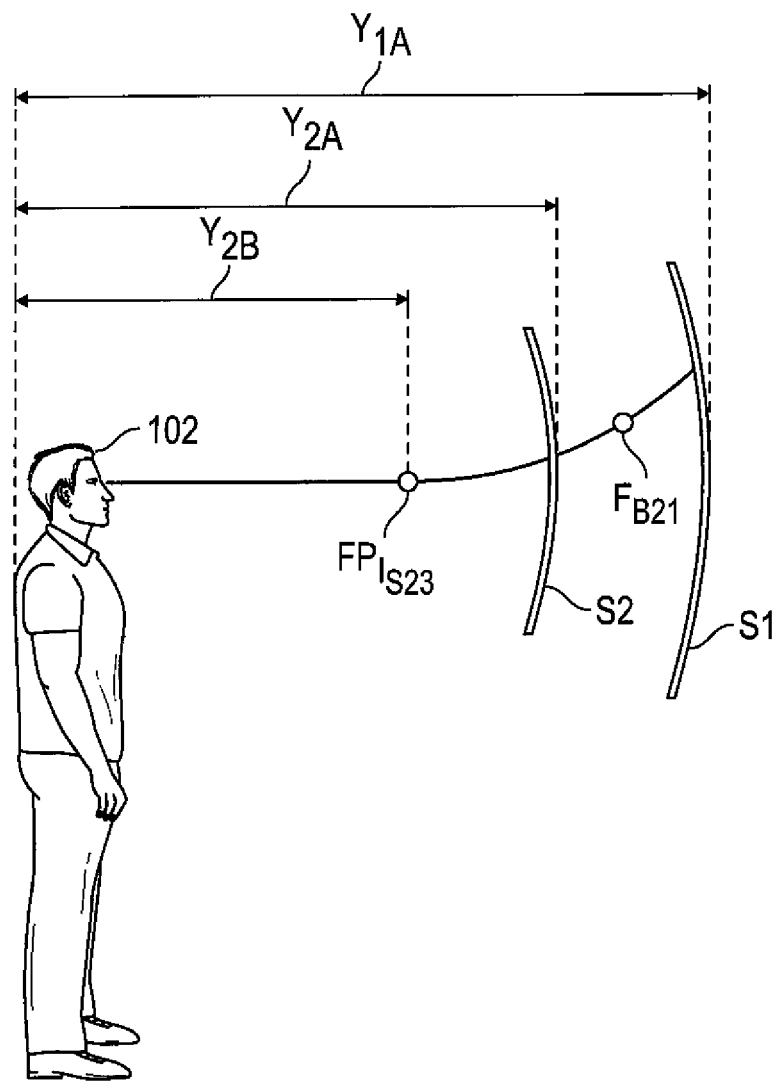
Figure 7A:
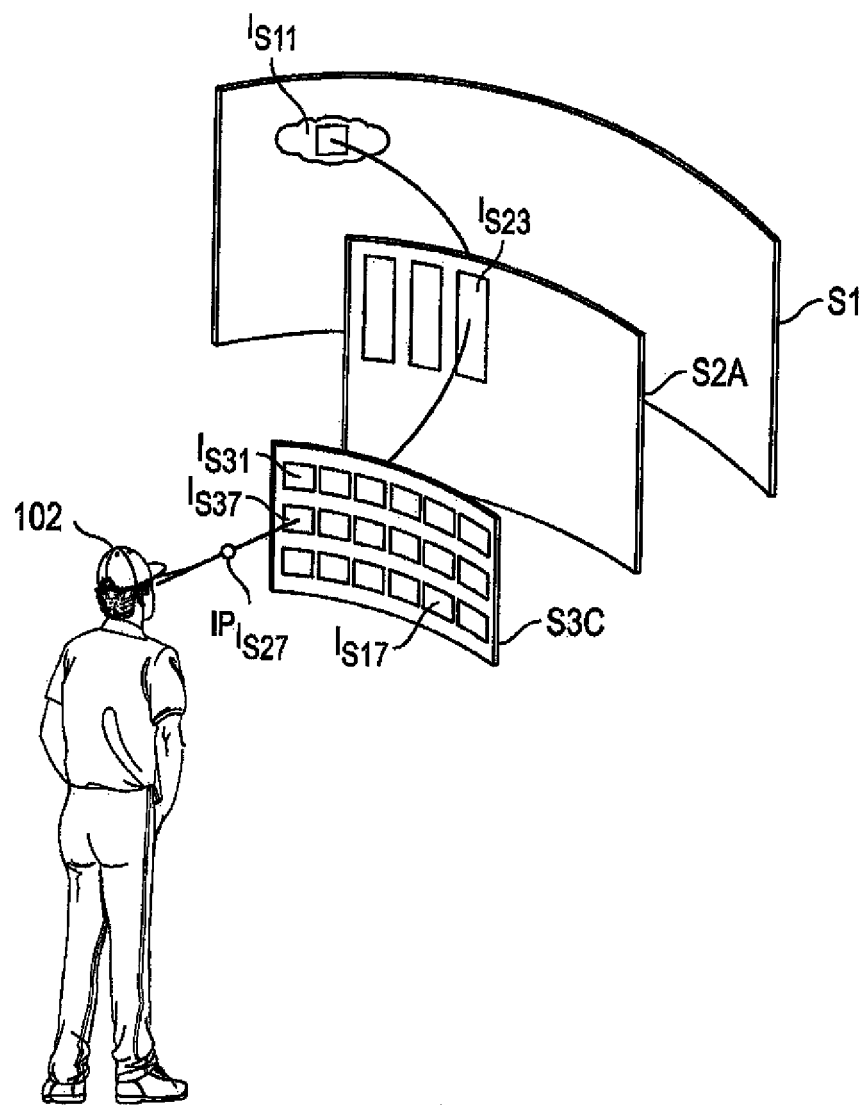
Figure 7B:
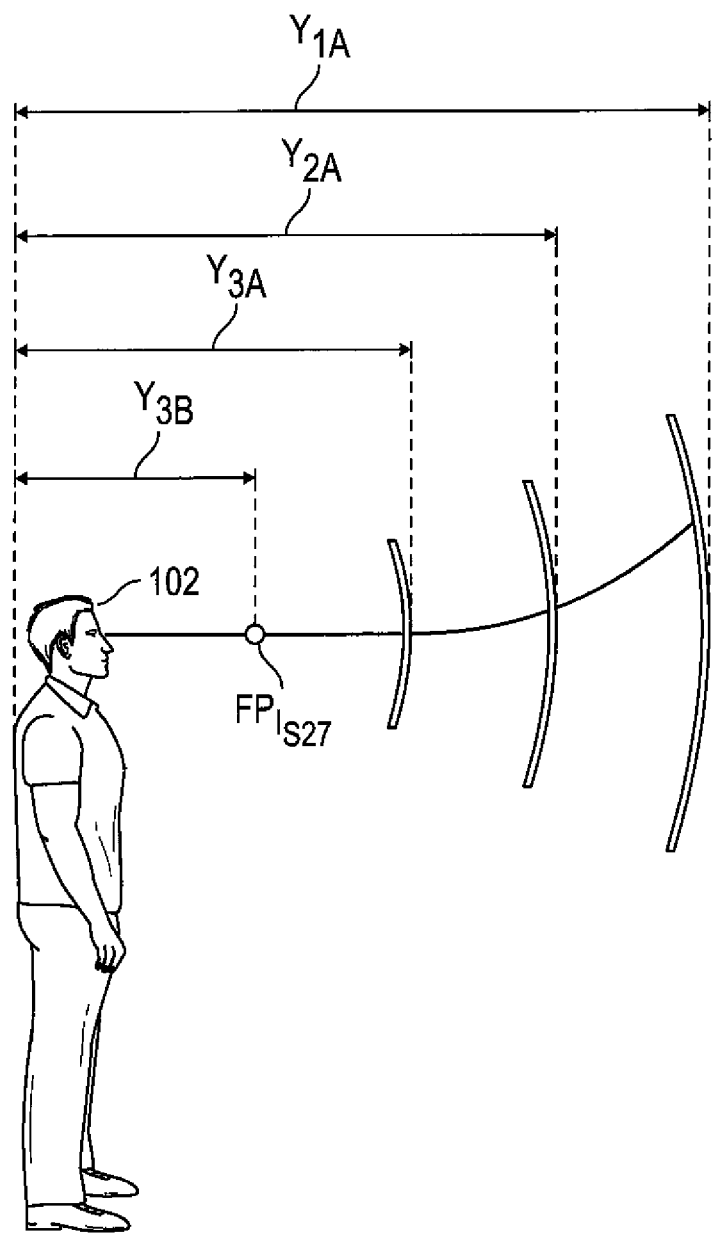
Figure 8A:
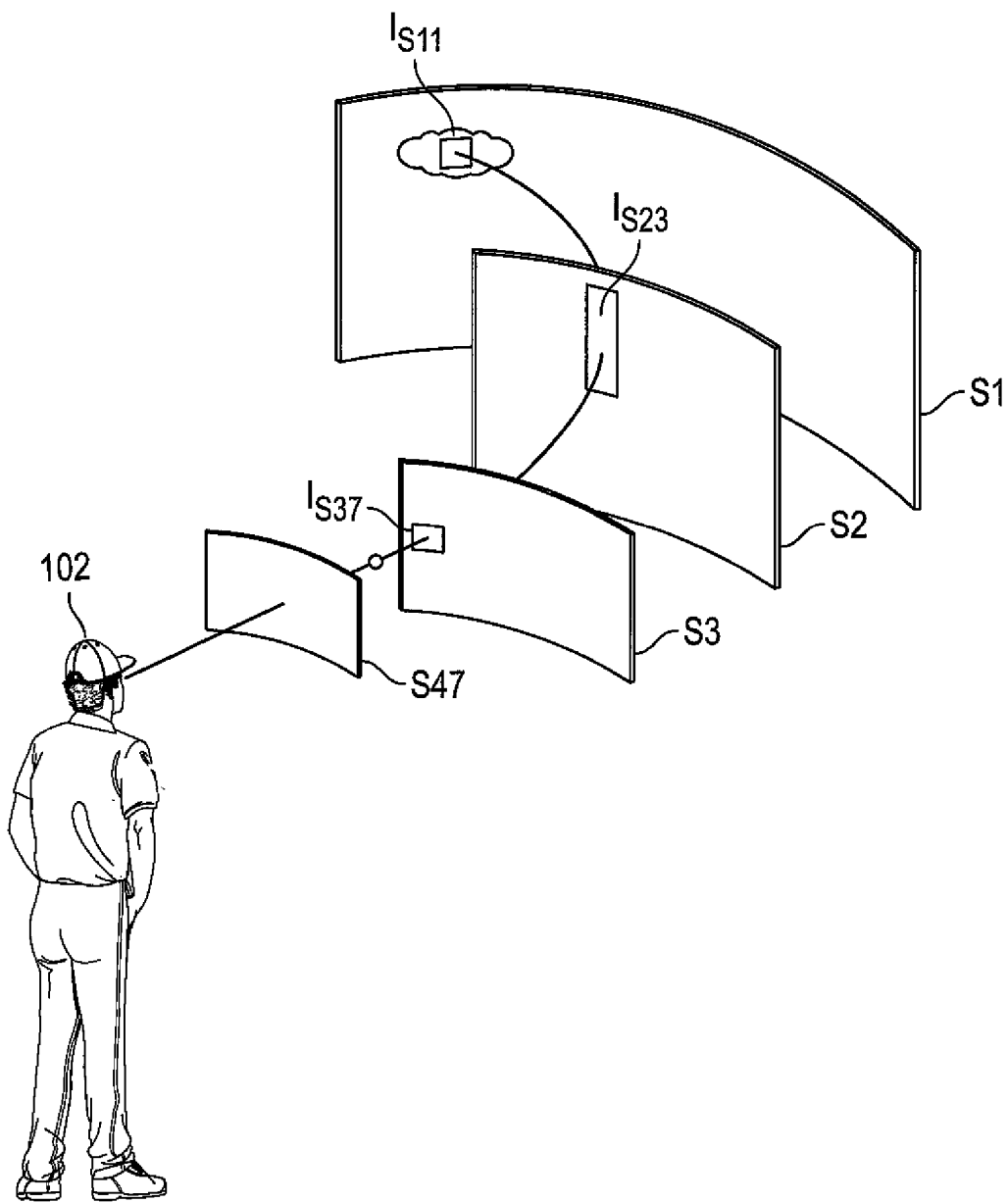
Figure 8B:
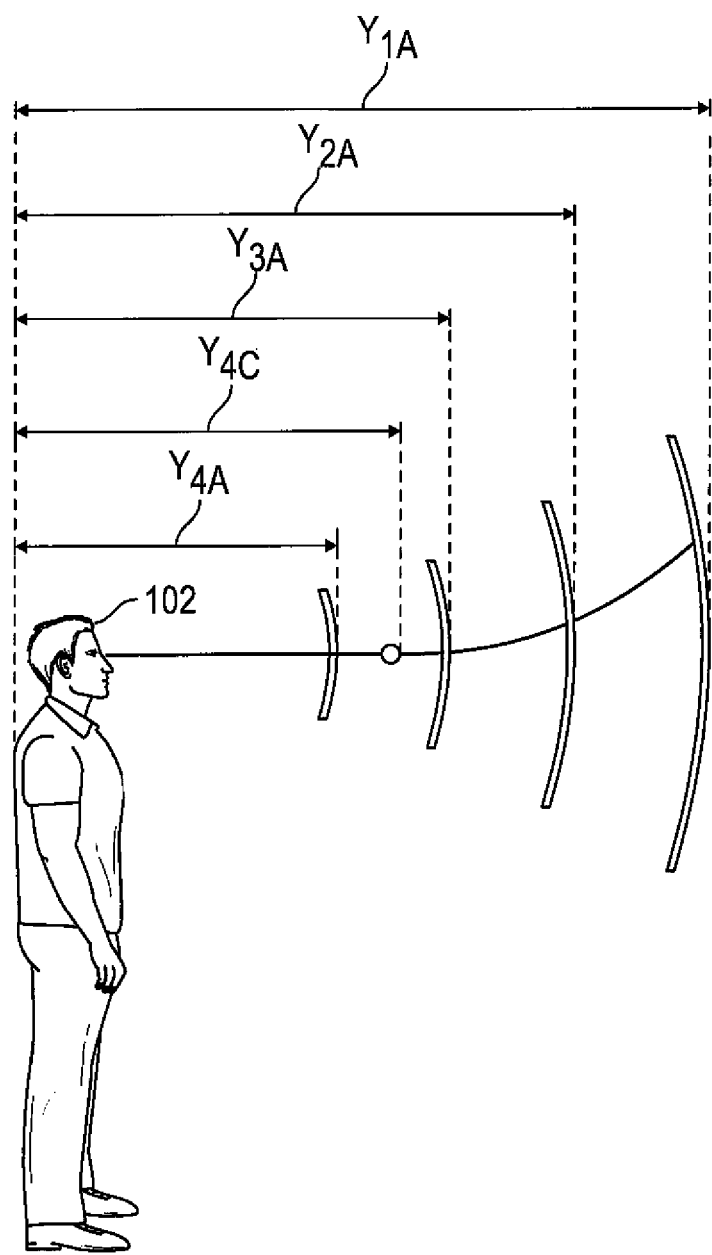

FIGS. 6A-6B show perspective and side views, respectively, of a viewer's head disposed at a distance $Y_{1A}$ from the first virtual display surface S1 and disposed at a second distance $Y_{2A}$ from a second virtual display surface S2A and at a distance $Y_{2B}$ from a second fixation point $FP_{IS23}$ associated with a third selectable item $I_{S23}$ displayed on the second virtual display surface S2A. The first virtual display surface S1 may continue to be displayed, although it can be deemphasized by being blurred or dimmed, for example. In the example in FIG. 6A, the virtual visual aid beam B1 is directed at item $I_{S23}$. Moreover, the virtual visual aid B1 optionally can extend behind the second surface S2A to extend to item $I_{S11}$. Thus, the visual aid beam B1 can illuminate the search path used to arrive at the second virtual display surface S2A. A third surface is selected in the same manner as above, as shown in FIGS. 7A-7B, and a fourth surface as shown in FIGS. 8A-8B.

Referring again to FIG. 6A, a back fixation point FB21 is shown for use to traverse backward from the second surface S2A to the first surface S1. From FIGS. 6A-6B, it can be seen that the back fixation point FB21 is disposed more distant from the user than is the second virtual display surface S2A. In accordance with some embodiments, the user can navigate back through the menu structure analogously to how the user navigates forward. In some embodiments, the second surface S2A disappears (not shown) upon selection of the first virtual display surface S1.

Table 1 is an exemplary information structure stored in a computer readable storage device for use to configure a processor, while the first virtual display surface is displayed, to control an image generation device to transition to a different virtual display surface in response to information received from a head tracker device and information received from an eye tracking module, in accordance with some embodiments.

TABLE 1

While Currently Displaying Virtual Display Surface S1

| Detected Head Direction | Detected Fixation Point | Next Virtual Display Surface |
|---|---|---|
| $I_{S11}$ | $FP_{IS11}$ | $S_{2A}$ |
| $I_{S12}$ | $FP_{IS12}$ | $S_{2B}$ |
| $I_{S13}$ | $FP_{IS13}$ | $S_{2C}$ |
| $I_{S14}$ | $FP_{IS14}$ | $S_{2D}$ |
| $I_{S15}$ | $FP_{IS15}$ | $S_{2E}$ |
| $I_{S16}$ | $FP_{IS16}$ | $S_{2F}$ |

Thus, for example, in accordance with the information structure of Table 1, while the first virtual surface S1 is displayed, in response to detection of user head direction toward $I_{S13}$ and user eyes fixating upon $FP_{IS13}$ and blinking, virtual screen display S2c is displayed.

Table 2 is an example information structure stored in a computer readable storage device for use to configure a processor, while the second virtual display surface S2A is displayed, to control an image generation device to transition to a different virtual display surface in response to information received from a head tracker device and information received from an eye tracking module in accordance with some embodiments.

TABLE 2

While Currently Displaying Virtual Display Surface S2A

| Detected Head Direction | Detected Fixation Point | Next Virtual Display Surface |
|---|---|---|
| $I_{S21}$ | $FP_{21}$ | $S_{3A}$ |
| $I_{S22}$ | $FP_{22}$ | $S_{3B}$ |
| $I_{S23}$ | $FP_{23}$ | $S_{3C}$ |

Persons skilled in the art will appreciated that in accordance with some embodiments, each virtual image, item, object, menu and so forth that is displayed to the viewer can be associated with a spatial location off of the active visual surface and some response that can be triggered, at least in part, by fixating upon that location.

Figure 9:
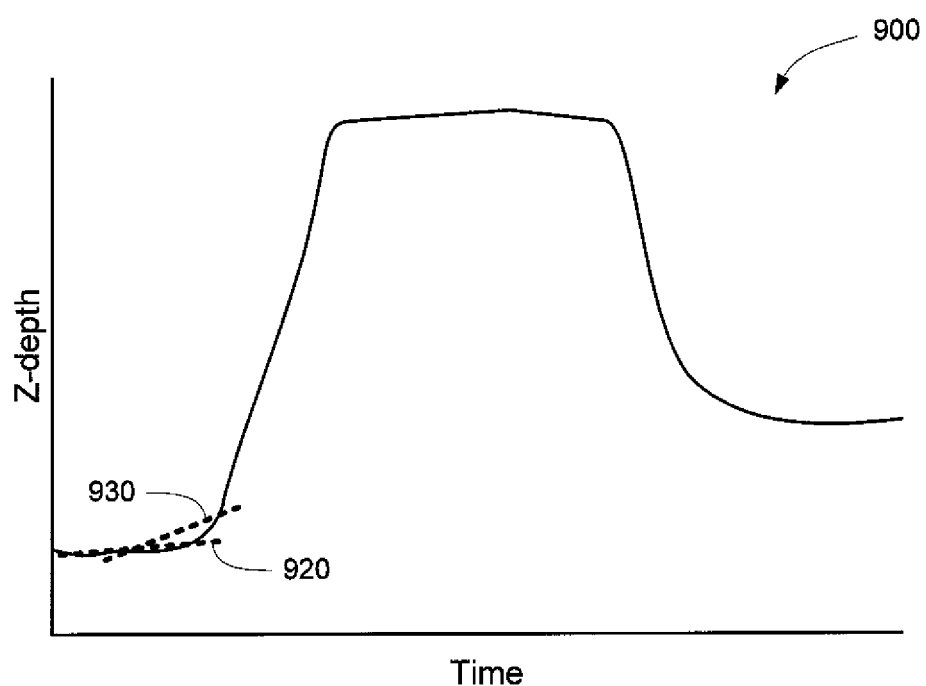
FIG. 9 is a graph illustrating how z-depth for binocular fixation varies as a person's eyes fixate on objects at various distances.

FIG. 9 shows an exemplary graph 900 of the z-depth 910 of a user's eyes as they fixate from a near object to a far object to one in between. The z-depth 910 remains fairly constant while fixation remains on any object, then shifts quickly to the next. A simplistic means of detecting the vergence of the viewer's eyes that is sufficient to trigger a response includes monitoring the z-depth for a change by more than a threshold distance. Thus, the change from one average z-depth 910 to another beyond a threshold could be a trigger. A first derivative of the z-depth 910 as a function of time is approximately zero while the viewer fixates on each object, and either spikes positive or negative when the eyes converge or diverge. Thus, the first derivative, if it exceeds a threshold, or indeed any computable dynamic characteristic of motion, can be another possible trigger. Similarly, one can sample z-depth 910 with a given frequency and create a rolling average of n number of samples, and then monitor the difference between two such rolling averages, where the two are offset in time by some number of samples. Such an example is illustrated by lines 920 and 930, and although they are best fits to the curve, one can see how an average of the z-depth values will change, as will the difference between them. Thus, another trigger can be that the difference between two rolling averages exceeds a threshold. In further embodiments, the z-depth data is processed, such as by smoothing, before being analyzed to detect eye vergence. Data processing of the z-depth data can include applying windowing functions. Further, median values can be used in place of averages. In still further embodiments a second derivative of the z-depth data is determined and can be used to vary salience values of visual aids, for example.

Figure 10:
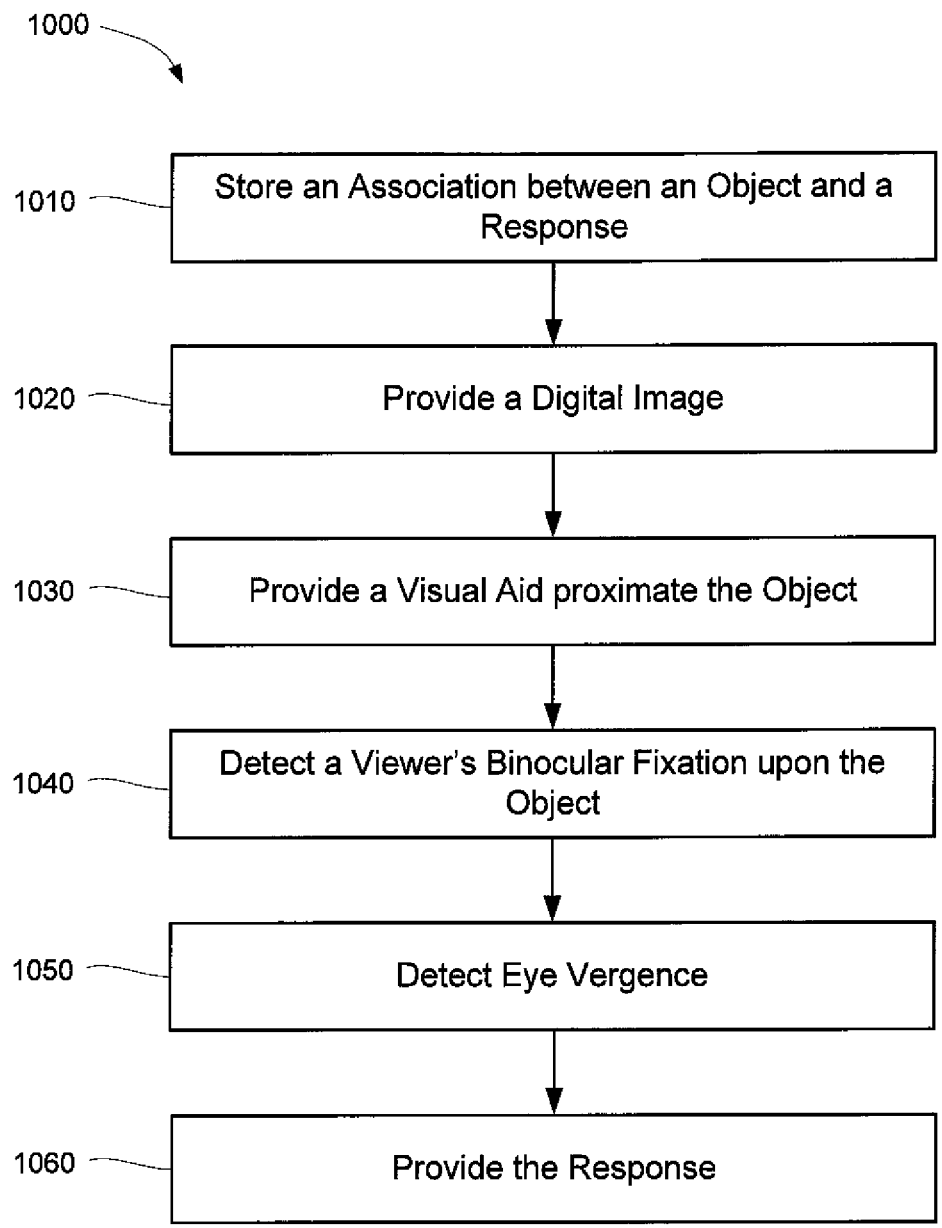
FIG. 10 is a flowchart representation of a method according to various embodiments of the invention.

FIG. 10 is a flowchart representation of an exemplary method 1000 of the present invention for providing control to a user. The method 1000 begins with a step 1010 of storing an association between an object and a response in a non-transitory storage device. The object can be real, such as a lamp, or an item shown in a 2D display such as an advertisement displayed on a cell phone, or can be a virtual object in a virtual reality or in an augmented or mixed reality. Storing the association allows the response to be retrieved as needed when a selection implicates the object.

An optional next step 1020 comprises providing a digital image. The step is optional in as much as embodiments of the present invention do not require the creation of virtual objects but can operate on real objects as well. In a further optional step 1030 a visual aid is provided in the viewer's field of view and proximate to the object. Where the object is a real object, headsets like those described above, as well as other systems, can be used to display visual aids to the viewer even in the absence of any other digital image content.

In an optional step 1040, an eye tracking module is used to detect binocular fixation of the user's eyes upon the object. This step is also optional in as much as in some instances one could look in the direction of an object without actually fixating on it. Detecting binocular fixation upon the object can include determining that the binocular fixation of the eyes is within a threshold distance of the object. In a step 1050, vergence of viewer's eyes is detected, again using the eye tracking module. In both steps, monitoring the z-depth of the binocular fixation of the eyes can be employed. Step 1050 can optionally include receiving a confirmation signal from the viewer.

In a step 1060 the response is provided. The response can be either discrete or not. In those embodiments in which the response is not discrete, for example, the response can be continuous with a feedback loop between steps 1050 and 1060 such that the response is dependent upon continuous monitoring of eye vergence.

Figure 11:
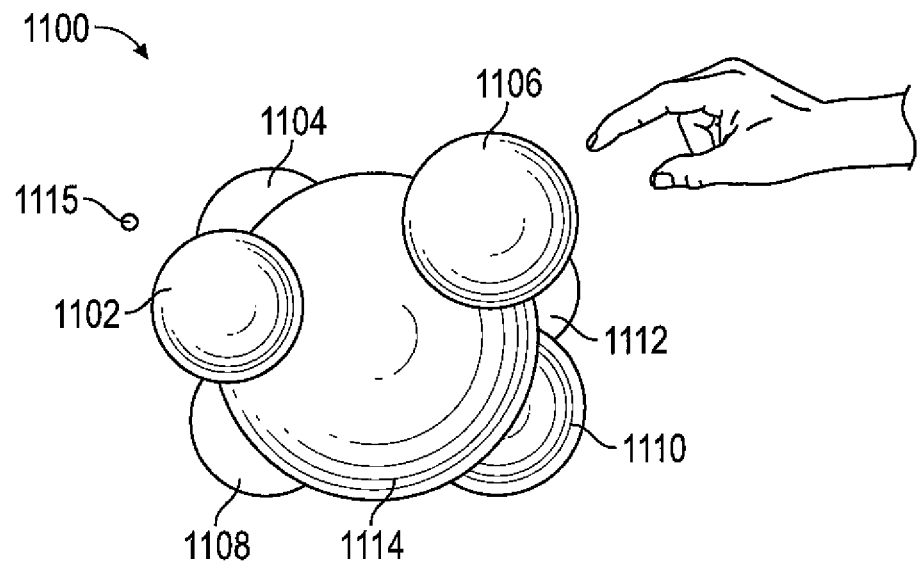
FIG. 11 illustrates a virtual display surface embodiment comprising multiple intersecting spheres, according to various embodiments of the invention.
Figure 12:
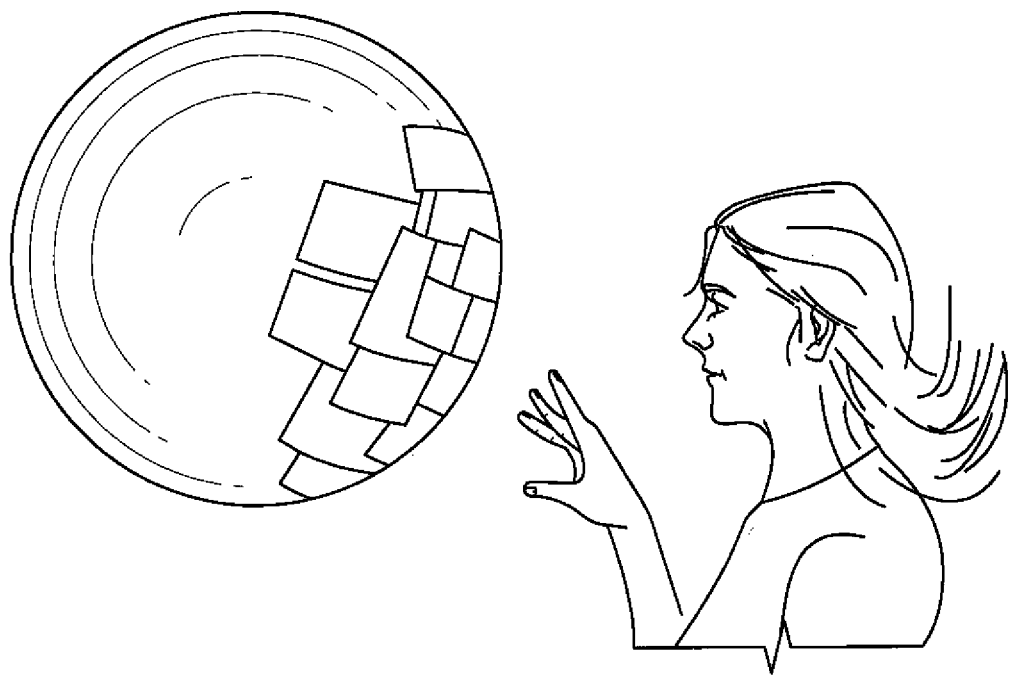
FIG. 12 shows the virtual display surface embodiment of FIG. 11 further comprising a virtual enlarged sphere with multiple tiled images produced in response to a selection.

FIGS. 11 and 12 illustrate another virtual display surface embodiment of the invention. FIG. 11 shows a virtual display surface comprising multiple intersecting virtual spheres 1102-1114, each corresponding to a different dataset. In the illustrated example, the spheres are labeled to indicate the types of data they are associated with, e.g., work, sports, holiday. To select a dataset, in some embodiments, the user directs her gaze at a sphere of the surface and draws her gaze towards her, possibly assisted by a visual aid seen proximate to the sphere. In some instances the selection is confirmed by a signal like a wink or head nod. In response, a processor causes an image generation device to produce a new virtual image such as the virtual enlarged sphere shown in FIG. 12 with numerous image tiles posted on it.

The foregoing description and drawings of embodiments in accordance with the present invention are merely illustrative of the principles of the invention. Therefore, it will be understood that various modifications can be made to the embodiments by those skilled in the art without departing from the spirit and scope of the invention. The use of the term "means" within a claim of this application is intended to invoke 112(f) only as to the limitation to which the term attaches and not to the whole claim, while the absence of the term "means" from any claim should be understood as excluding that claim from being interpreted under 112(f). As used in the claims of this application, "configured to" and "configured for" are not intended to invoke 112(f).

What is claimed is:

1. A system for providing control to a user, the system comprising:
   a non-transitory storage device storing an association between an object and a response;
   an eye tracking module configured to determine lines of sight for both of the user's eyes; and
   a processor configured to
      receive the lines of sight and determine both the user's gaze therefrom and to measure the viewer's eye vergence, and
      provide the response following first a determination of a binocular fixation upon the object that includes determining that the binocular fixation of the eyes is within a threshold distance of the object and includes monitoring the z-depth of the binocular fixation of the eyes and determining that the z-depth has remained within a threshold range for at least a threshold dwell time, and then a detection of a simultaneous movement of the pupils of the viewer's eyes toward or away from one another, wherein the response is a virtual response that changes a presentation of a virtual reality to the user.

2. The system of claim 1 wherein the system comprises a headset including a display screen and an image generation device.

3. The system of claim 2 further comprising a spatial sensor.

4. The system of claim 1 further comprising a head tracking module.

5. The system of claim 1 wherein the processor is further configured to generate a visual aid in the viewer's field of view proximate to the object.

6. A method for providing control to a user comprising:
   storing, in a non-transitory storage device, an association between an object and a response;
   using an eye tracking module to first detect binocular fixation of the user's eyes upon the object, then to detect a simultaneous movement of the pupils of the viewer's eyes toward or away from one another, wherein detecting binocular fixation upon the object includes determining that the binocular fixation of the eyes is within a threshold distance of the object and includes monitoring the z-depth of the binocular fixation of the eyes and determining that the z-depth has remained within a threshold range for at least a threshold dwell time; and then
   providing the response, wherein the response is a virtual response that changes a presentation of a virtual reality to the user.

7. The method of claim 6 wherein detecting the vergence of the viewer's eyes includes monitoring the z-depth of the binocular fixation of the eyes and determining that the z-depth has changed by more than a threshold distance.

8. The method of claim 6 wherein detecting the vergence of the viewer's eyes includes monitoring the z-depth of the binocular fixation of the eyes and determining that a first derivative of the z-depth, or a difference between offset rolling averages, has changed by more than a threshold amount.

9. The method of claim 6 further comprising, using an image generation device, generating a visual aid in the viewer's field of view proximate to the object.

10. The method of claim 9 further comprising varying the salience of the visual aid as a function of the viewer's gaze.

11. The method of claim 10 further comprising varying the salience of the visual aid as a function of the viewer's eye vergence.

12. The method of claim 6 further comprising detecting a blink using the eye tracking module, wherein providing the response is further responsive to detecting the blink.

* * * * *